United States Patent
Koslow

(10) Patent No.: US 8,220,729 B2
(45) Date of Patent: Jul. 17, 2012

(54) RECYCLING METHOD FOR ELECTRONICS SCRAP IN ORDER TO OBTAIN REUSABLE MATERIALS WHILE AVOIDING THE RELEASE OF HARMFUL SUBSTANCES

(76) Inventor: Alexander Koslow, Landshut (DE)

( * ) Notice: Subject to any disclaimer, the term of this patent is extended or adjusted under 35 U.S.C. 154(b) by 0 days.

(21) Appl. No.: 13/232,802

(22) Filed: Sep. 14, 2011

(65) Prior Publication Data

US 2012/0000999 A1    Jan. 5, 2012

Related U.S. Application Data

(63) Continuation of application No. PCT/DE2009/000352, filed on Mar. 14, 2009.

(51) Int. Cl.
   *B02C 19/00*    (2006.01)
(52) U.S. Cl. .................... 241/20; 241/24.14; 241/24.18; 241/29
(58) Field of Classification Search .................... 241/20, 241/29, 24.14, 24.18, 79.1, DIG. 14, 78; 209/3.1
See application file for complete search history.

(56) References Cited

FOREIGN PATENT DOCUMENTS

| | | |
|---|---|---|
| DE | 19600647 A1 | 7/1997 |
| DE | 19651571 A1 | 6/1998 |
| DE | 19949656 A1 | 4/2001 |
| DE | 10344861 A1 | 4/2005 |
| DE | 102004041494 A1 | 3/2006 |
| DE | 102005017334 A1 | 10/2006 |
| DE | 102006034692 A1 | 1/2008 |
| EP | 0524396 A2 | 1/1993 |
| WO | 0054885 A1 | 9/2000 |

OTHER PUBLICATIONS

International Preliminary Report on Patentability; Application No. PCT/DE2009/000352; Issued: Feb. 2, 2011; 5 pages.
International Search Report and Written Opinion of the International Searching Authority; Application No. PCT/DE2009/000352; Issued Nov. 16, 2009; 7 pages.

*Primary Examiner* — Mark Rosenbaum
(74) *Attorney, Agent, or Firm* — St. Onge Steward Johnston & Reens LLC

(57) ABSTRACT

A process for industrial disposal for electro-waste. The process contains steps for separating material that are contained in such waste, for re-introducing material into a re-using process in order to save resources and to meet ecologic and economic interests.

12 Claims, 1 Drawing Sheet

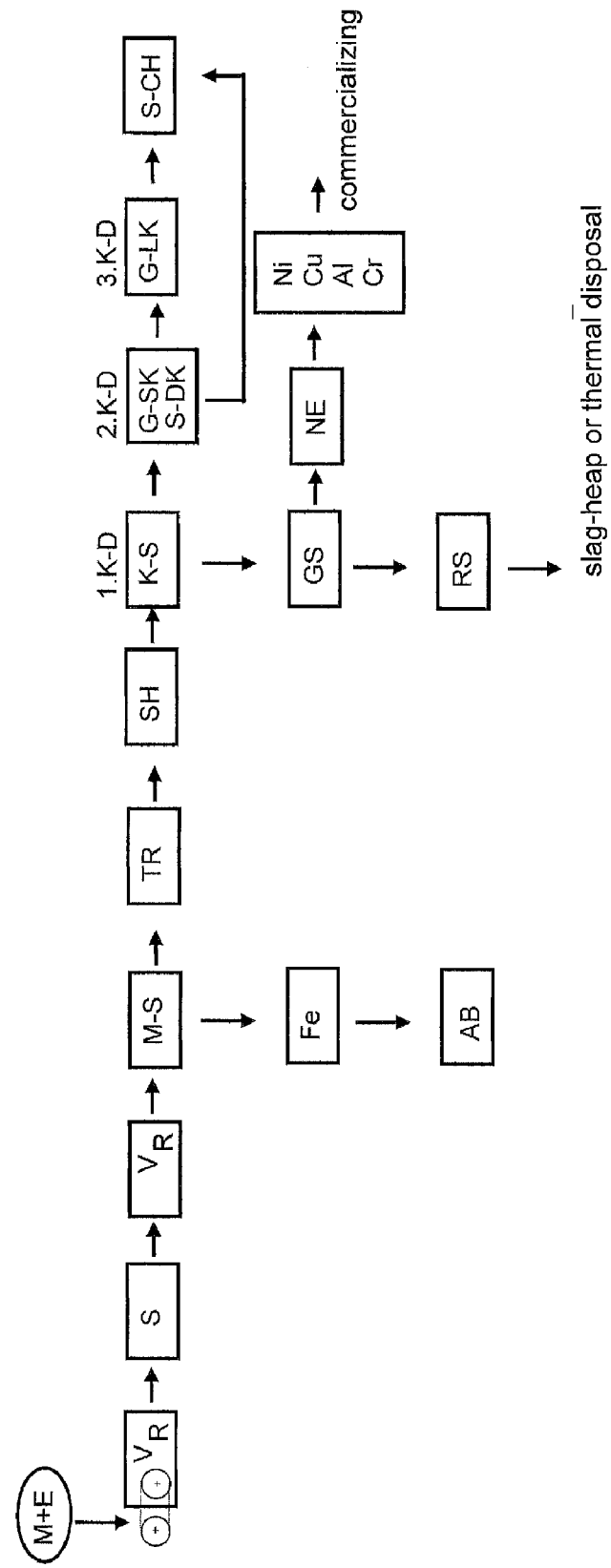

RECYCLING METHOD FOR ELECTRONICS SCRAP IN ORDER TO OBTAIN REUSABLE MATERIALS WHILE AVOIDING THE RELEASE OF HARMFUL SUBSTANCES

CROSS-REFERENCE TO RELATED APPLICATIONS

The present application is a continuation of pending International patent application PCT/DE2009/000352 filed on Mar. 14, 2009 which designates the United States and the content of which is incorporated herein by reference.

FIELD OF THE INVENTION

The invention is directed to dressing of electronic waste for recovering re-usable material. Individual processing steps are necessary in order to avoid escape of toxic stuff into atmosphere contained in such waste, since such waste comprises a plurality of different materials. There are still closed electronic components that contain toxic material that is released by physical or thermal destruction, e.g. electronic tubes, capacitors etc.

BACKGROUND OF THE INVENTION

There are already known processes by which electronic waste is treated at deep temperature for the purpose to brittle plastic materials in order to facilitate their later comminution. In a follow-up process iron and non iron materials are separated from plastics by well known measures using magnets or high frequency sorting processes or by hand (E 196 00 647 A1). A disadvantage for such procedures and related machinery is that for comminution of electronic waste hammer-mills are used, which comminute such waste in a non-predictable way. That means that components containing noxious elements, such as mercury, capacitors and similar subjects so that noxious material may escape into atmosphere.

A similar process is described in the German publication DE 10 2004 041 494 A1. Composite material containing, pre-treated and partly destroyed mixture of stuff is handled in such process. Firstly in a rough comminution step a destruction of housings takes place followed by a sorting step by which so called disturbing material that contains noxious particles is separated. Further steps for separation of iron and non-iron materials and for stuff like a conglomerate of wires and similar subject follow. In continuation follow steps of fine sorting of metals and plastics. Even this process does not take into consideration the essence of this invention. In order to avoid escape of noxious particles into atmosphere even at the first destruction of a mixture of materials to be sorted not each kind of destruction of housings and surroundings can be chosen since they may contain contaminated components. Only a particular installation characterized by this invention can be used for the execution of the related step in this process. The essential of this invention is to spot this necessity.

Further processes are known to separate metal and plastics out from a conglomerate of a mixture of stuff by a flotation process. This process is for handling household waste where by the main aspect is a thermal disposal. Dressing of electronic waste, even of separating noxious elements from material components is not part of this disclosure. The main purpose of this disclosure is to separate non-inflammable material from inflammable one from household waste (DE 10 2005 017 334 A1).

In a further disclosure the target defined is to regain plastics from waste, however no means are indicated on how to achieve this goal. Solely to indicate that achieving of this goal should be by a flotation process or by a thermal one is not sufficient for executing that teaching by a person skilled in the art (DE 196 51 571 A1).

It is also known to use sensors, ultra violet radiation and other technology to identify and to determine plastics and metals according to their specific density and to separate them (DE 199 49 656 A1)

Hence, individual and combined measures are known to separate individual stuff components from a conglomerate of stuff in order to return them to re-usage in accordance with their individual character. However, all these measures comprise one essential deficit, which is to be seen in, when starting the process a mechanical comminution takes place and in consequence a destruction of the original material construction happens earlier to the removal of components containing noxious particles. Hence, noxious stuff may escape into the environment or the escape of such stuff is not even minimized. Such procedures do not meet any more legal regulations and hence, cannot anymore be accepted.

On the contrary a comminution that results in a destruction of construction elements that contain noxious particles is only allowed, in compliance with the existing legal regulations, once such construction elements were eliminated from a conglomerate of electronic waste. Such a selection of particular construction elements demands for a manual or by machine performed pre-sorting in a closed room, in order to enable sorting out of mercury-switches and similar noxious particles contained in construction elements. Therefore, known sites can only handle electronic waste that was earlier cleared from noxious material. Manual pre-sorting, without a comminution of housings, is not only inefficient and time consuming, but also demands for a high financial contribution.

SUMMARY OF THE INVENTION

A goal for the present invention is to make known a process that is released from such disadvantages and that meets presently existing legal objectives for recovery of electronic waste.

This invention proposes a process, compared to the known ones, which prevents to the utmost releasing of noxious particles when disposing electronic waste. Equally it shows how re-usable material components can be separated from one-another so that they can be redressed in a way that resources are saved and in a material conform way in order to facilitate their reintroduction in a production process as valuable raw material.

It is evident that known processes have to be combined with unknown ones.

It is essential for this invention that, besides the usage of known procedural steps, destruction of housings is executed in such a careful manner that a violation of noxious particles containing material components is avoided.

After carrying out a rough manual or careful mechanical eliminating step for separating noxious particles encumbering or containing components within the conglomerate to be sorted in a closed room and after taking away of cables in order to avoid creation of coil of wires follows a step of comminution of the remaining conglomerate of material solely by a so called smasher (never by using a shredder or a hammer mill or another squeezing or cutting comminution)—a smasher is to be understood as a rotating drum of a large diameter, with cams fixed to the drum wall or independently rotating cams that transport the material fed in, to the highest spot of the drum from where it falls down and then crashes by an impact, however, without being squeezed. By this comminution process, condensers being part of the surrounding housing will be release without being squeezed or cut in pieces and from that follows that noxious components, being included in the interior of the condensers, cannot escape.

By this way obtained material will be free of noxious particles, which still may be included after the first sorting step in this process (condensers, LCD display monitors, etc.).

This procedural step is followed by an elimination of big and voluminous housing elements made of plastic material.

This step is followed by a magnetic determination of iron material and its separation by using electro magnets.

Separation of bulky and big construction elements (made from aluminium, copper, precious metal and similar materials or plastics) in order to protect comminution machinery and to extend its tool life.

Comminution of the remaining residual material, that may be made of plastics or other material; that comminution may be carried out by all kind of cutting machinery, e.g. shredder or hammer-mills, or one or more shaft mills, since noxious stuff containing components had already earlier been eliminated.

The already crushed material is introduced into a flotation basin filled with water, which co-operates with a pulsation producing installation, adjustable in its intensity; in this flotation bath the first separation of plastics from material heavier than plastics takes place.

Further flotation steps follow, which are also equipped with adjustable pulsation installations, the frequency of them can be precisely adapted to the plastics to be separated, in order to enable sorting plastics in accordance with their specific property; then follows an identification of their property.

After having been identified and determined thus obtained plastics of equal characteristics were granulated and packed and reintroduced as raw plastic material into a new moulding process.

Parallel to the reintroduction of plastics into a fabrication process all other materials, which are heavier than plastics are undergoing a separation process for non-iron materials and stuff that cannot further be used, e.g. stones, wood and similar material.

All non-iron material will be sorted along their specific property e.g. Al, Ni, Cr, Ag, Au and so on, in a high frequency or other sorting machinery developed for this purpose in order to return them into a production process complying with their characteristics.

The goal of this invention has been achieved by such a joint concept, which starts from a conglomerate of various materials and which delivers at the end of a process line all in electronic waste contained reusable stuff, in order to return individual stuff to its proper usage. A continuation of further sorting can thus be avoided. Remaining residual waste consists of stuff that can only be deposited on a waste dump or by thermal means since all further industrial re-usage is excluded.

This invention comprises a process, which contains a pre-dressing system which consists of several individual steps that follow needless one-another and that does not exclude feedback steps so that utmost efficiency and purity of different sorts of recovered stuff is warranted. Linked to that is minimizing of costs for the construction of the installations for carrying out such process.

It is essential for the whole process line of this first mechanical dressing for separation purpose of electronic waste by using a smasher. Smashers per se are already known, however, their functional importance for dressing electronic waste has not yet earlier been detected. Such a smasher may be designed as a rotating drum, which comprises at least one smasher room at which carriers attached to rotating walls were distributed all over the interior wall side. The drum that is preferably centrally fixed in a rotational way in bearings on each closed front side of the drum. The bearings are pivoted to bearing stocks that are fixed to foundations. The drum is equipped with an adjustable drive. Varying the revolution of the drum may influence the intensity of destruction of the conglomerate of waste. There are also known construction of smashers with a non movable drum-housing but this type is equipped with carries fixed to a rotating support unit that is open to the interior surrounding wall and which rotating speed is preferably also adjustable. This type of smasher may have located opposite to the culmination point of the drum housing damping material may be filled into a groove that damps the down falling of the material thus reducing destruction energy and enabling adaptation to the needs of individual type of material in order to avoid escaping of noxious particles. For this purpose it is also possible to have drum housing and support unit for carriers rotating in the same or opposite direction at equal or different speed. It is self evident that the interior of the drum has an inlet opening for the material to be treated and an outlet opening for the material already finished.

The material pre-sorted and crashed by a smasher is transported into a material separating machinery where ferromagnetic material is separated from the total conglomerate. After that operation, once bulky and voluminous construction parts were sorted out by hand or by a machine, a further comminution by a comminution machine like a shredder or hammer mill or similar machinery takes place. In a follow-up procedural step the conglomerate, thus pre-prepared, undergoes a separation of plastics from stuff that is heavier than plastics in a water bath flotation process. Stuff heavier than plastics settles on a vibrating bottom that has openings like a screen, from where they are transported to an exit opening with a controllable cross section that leads to a container. This transportation is based on the jerky motions of the vibrating bottom. This jerky motion puts kinetic energy to the stuff and moves it in one direction towards an exit opening.

The material heavier than plastics non-iron parts will be separated for example by a high frequency installation. Separated non-iron particles will be submitted a magnetic field rotating at high speed that is created by an arrangement of permanent magnets (at least 50) on a roller. The magnets can also be electric ones. This magnetic field causes that non-magnetic metals are separated from residual stuff and will be shifted into a container. For precise identification and separation of non-iron metals according with their chemical assignment e.g. copper, aluminium, nickel, chrome etc. a follow-up equipment is needed that for example works on a spectrometric basis or the radioactive radiation of isotopes or in accordance with high frequency inductive or volumetric/weight basis.

Residual waste e.g. stones, concrete residuals, wood etc. will be taken away after non-iron material was separated. As far as flotation liquid will be expelled it has to undergo a cleaning process before being re-introduced into the flotation bath.

Plastics separated in the course of the first flotation process will be introduced into a second flotation basin also filled with pure water that is kept in motion by pulsation equipment the frequency of which is precisely adapted to the needs of the material to be separated. In this second flotation bath plastics are separated corresponding to their density.

A fine separation of already roughly separated plastic material may take place, if so wanted, in further flotation bathes with pulsating liquid, where also density of plastics will be the governing parameter. An exact adaptation of the pulsation frequency to the plastics to be separated is therefore unavoidable. Such separation of plastics may be repeated as frequently as needed. Therefore series of flotation bathes may follow one-another.

When separating plastics in conformity with their density it may be helpful also to modify the density of the flotation liquid in order to adapt it to hydrophobia of the plastics to be separated by adding chemical substances. Such chemical substances may performably be salts as $CaCl_2$.

After having completed flotation processes regained plastics are continued for a fine sorting to installation, which may differentiate kind of plastics e.g. PVC, PE, PPC, ABC and others. Such installations mostly work on the basis of X-rays, Infra-red systems with or without recognition by a camera, Laser-beams, with or without recognition by a camera, Differences in colour by recognition by a camera.

These processes guarantee an exact determination of plastic material.

This inventive process comprises all steps a conglomerate of material has to pass by its way from removal to a material immanent salvaging of electronic waste. All reusable components contained in such a conglomerate of electronic waste and their reintroduction in a material immanent production process is therefore guaranteed without any negative influence on the environment.

In a FIGURE that way of electronic waste to a reusable raw material is outlined along the line of the inventive process.

BRIEF DESCRIPTION OF THE DRAWINGS

FIG. 1 is a flowchart of a recycling method of an embodiment of the present invention.

DETAILED DESCRIPTION OF THE INVENTION

Electronic waste is taken to a closed room (R) by a conveyer-belt (B) where a manual or mechanical pre-selection takes place, for sorting out e.g. cables, mercury switches etc. that contain toxic particles or tend to form lumps. After having passed this pre-sorting (V) stage electronic waste is comminuted in a so-called smasher (S). A smasher is a cylindrical drum (as already described) with a large diameter that takes the material filled in to the highest spot and then makes it fall down for having fragile construction elements bursting by impact on the lower part of that drum. However, condensers and similar parts do not burst, since the impact can be controlled. By such a way of destruction noxious particles originating from those construction elements cannot escape. Though it differs from working on such construction elements by all other type of destruction machinery as shredders (SH), or hammer-mills and similar machinery, which destroy such construction elements by cutting or wrenching them. Afterwards an additional step of sorting of all material treated in a smasher (S) takes again place in a closed room (R). Condensers and similar construction elements containing noxious particles will be eliminate by hand or mechanically. In a follow-up step all ferro-magnetic particles (FE) are sorted out by magnetic sorting machinery (M-S). Remaining material, after having been cleared from noxious and iron components and, in an intermediate step, being manually or mechanically cleared from bulky and voluminous construction components is taken to a comminuting installation as shredders, hammer-mills and similar equipment for further comminution to very small particles, since they only can difficultly be cut to pieces. The conglomerate thus obtained is treated in a first flotation installation (K-S) that operates with a flotation liquid of pure water that is kept under motion by a pulsation generating equipment (P). This process step is for separating particles of the conglomerate that are heavier than plastics. The heavier particles (GS) settle in the flotation basin (K-S) on a jerkily reciprocating perforated bottom (SB) that moves slowly in one direction and accelerated in the counter direction stopping jerkily. This way of motion generates in the heavy material settled a kinetic energy that transports it towards an opening in the perforated bottom (SB) to an exit through which the material may fall into a container (AB) for being taken to follow-up installations for further treatment.

After the separation of plastics and other stuff being heavier than plastics procedural steps differ from one-another and follow two branches. One of these branches deals with further treatment of plastics and the other one with further treatment of other stuff, which is heavier than plastics.

The branch, which handles a continuation treatment for plastics, comprises at least a further flotation step (K-D) at which a separation of plastics to their density (S-DK) takes place. The flotation liquid of this step is kept under a controlled pulsation in vibration that is in correlation with the density of the plastic material to be separated. This operation leads to a separation of lighter plastics (G-LK) from heavier ones (G-SK). Such separation by flotation may be repeated as frequently as wanted only governed by grade of cleanness of the separated material. It may be advisable when separating plastics in accordance with their density to add to the flotation liquid chemicals, as preferably salts as $CaCl_2$. By this measure density of flotation liquid can better be adapted to the density of the plastics to be separated, which facilitates a faster working process. Such a separation process for plastics according with density be followed by another step for sorting plastics along their chemical assignment, e.g. PVC, PE, PPC, ABS etc. Such a separation line may be established, as a x-raying apparatus, or a radiation by laser-light with or without an identification of colours by using a camera, or a infra-red system with or without using a camera for identification of colours, or identification of colours using a camera, it is self evident that all these individual systems may be used in any combination.

The second branch that deals with material (GS) and its further sorting, which settled in the course of the first flotation step (KS) on the perforated bottom (SB), since being heavier than plastics, comprises procedural steps that lead to a separation of non-iron material from simple ballast and residual materials (RS). After having separated residual (RS) material that are taken to a slag-heap or to thermal re-usage, the non iron-stuff will be sorted along its chemical assignment as Cu, Ni, Cr, Al, Ag, Au etc. Such a sorting may be based either on a inductive, or isotope radiation or a comparison of weight/ Volume or a spectral-analytical process.

After having passed all such follow-up procedural steps all material regained from electronic waste may be re-introduced in a proper re-usage process. Such a handling does not only save natural resources but also guarantees a recycling of electronic waste (M) in an environmental friendly way and prevents escape of noxious materials.

With regard to economy and ecology flotation liquid being lost when delivering material components is submitted to a cleaning process prior to being returned into the flotation process.

What is claimed is:

1. A recycling process to regain re-usable raw material and avoiding escape of noxious stuff for electronic waste comprising the following steps:

a. conducting a first sorting step involving separating all evidently noxious material containing construction components in a closed room,
b. comminuting a mixture of remaining materials by a smasher,
c. conducting a second sorting step in a closed room involving separating noxious stuff containing material from not contaminated material,
d. separating ferro-magnetic material by using a magnetic system,
e. conducting a third sorting step involving separating bulky material and such of big volume,
f. conducting a second comminuting step of material already released from noxious material by using cutting equipment,
g. conducting a flotation process by using a water bath having a controllable vibration equipped with a adjustable pulsator for separating plastics from material heavier than plastics,
h. conducting an additional flotation process being equipped with controllable vibration of the bath of separation liquid for separating plastics of different density,
i. conducting an identification and determination of such plastics regained followed by a packaging and marking step in correspondence to individual identity,
j. conducting a follow-up treatment of the material heavier than plastics by a separation equipment to sort out non-iron stuff from residues as stones and similar objects by a procedure based on inductive or magnetic measures,
k. separating non-iron material by a sorting equipment that differentiates Al, Ni, Cr, Ag, Au etc, from each other, and
l. taking residues to a slagheap or a thermal disposal site.

2. The process of claim 1, characterized in that a smasher is used comprising a fixed drum in the interior of which a cam is placed the revolution and direction of movement of it may be controlled and which glides along the interior wall of that drum and that is pivoted concentrically to the drum and which is in open connection towards the inner wall of the drum.

3. The process of claim 1, characterized in that identification and separation of plastics in accordance with their chemical composition is made visible by using X-raying dependent from x-ray spectrum.

4. The process of claim 1, characterized in identification and separation of plastics in conformity with their chemical composition by laser-raying of the plastic material and in addition by using a camera for colour identification.

5. The process of claim 1, characterized in identification and separation of plastics in conformity with their chemical composition by infra-red raying and in addition by using a camera for colour identification.

6. The process of claim 1, characterized in that identification and separation of plastics in conformity with their chemical composition by colour identification by using a camera.

7. The process of claim 1, characterized in that identification and separation of plastics in accordance with their chemical composition is made visible by using X-raying dependent from x-ray spectrum and by laser-raying of the plastic material and by using a camera for colour identification and by infra-red raying and by using a camera for colour identification.

8. The process of claim 1, characterized in that for determining of non-iron metals by using the difference of isotopes based on their different radioactive radiation and separation of non-iron materials.

9. The process of claim 1, characterized in that separation of non-iron materials is carried out on the basis of the difference in their specific weight in combination with the individual volume.

10. The process of claim 1, characterized in that non-iron metals are identified and separated by using the difference in their individual inductivity.

11. The process of claim 1, characterized in that non-iron materials are identified and separated by application of a spectral-analytical procedure.

12. The process of claim 1, characterized in that for separation of plastics in compliance with their varying density flotation liquid is mixed with chemical substances as, salt $CaCl_2$.

* * * * *